United States Patent Office 3,674,533
Patented July 4, 1972

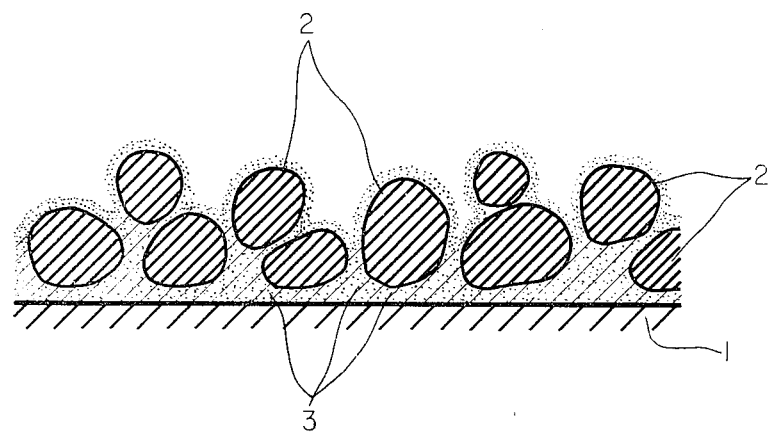

3,674,533
METHOD OF MAKING A MATERIAL FOR FORMING A WALL SURFACE
Mitio Matsubara, Marugame, Shigeyuki Yagyu, Oazahiga, and Satoru Takeuchi, Marugame, Japan, assignors to Shikoku Kasei Kogyo Company Limited, Marugame, Japan
Filed May 21, 1970, Ser. No. 39,242
Int. Cl. B28b 19/00; E04f 21/02
U.S. Cl. 117—27                                 4 Claims

ABSTRACT OF THE DISCLOSURE

Material for forming a wall surface with an embossed appearance and a method for making the same. The material comprises aggregate particles, colored clay, short fibers, and a water-soluble adhesive. The short fibers hold the aggregate particles to the wall surface. The material can be plastered on the wall surface by spraying or by trowelling.

---

This invention relates to a wall material and a method for making the same, and more particularly to a wall material with an embossed appearance and a method for making the same.

What is meant by "wall with an embossed appearance" is the so-called "Juraku" style wall, which is well known in Japanese architecture.

The wall material according to the present invention essentially consists of main ingredients including 50 to 95% by volume of aggregates made of particles with a mean diameter of 0.2 to 3 mm., which particles are, for instance, sand, crushed stone, wooden particles, synethetic resin, rubber, etc., said aggregates containing a suitable amount of at least one adhesive acting as a water-soluble paste, and 50 to 5% by volume of colored clay, and 1 to 15% by weight, based on the total weight of the main ingredients, of short fibers shorter than 2 mm.

With the wall material of the present invention, the short fibers act as a lubricant in the process of kneading with water and plastering, so that the workability of the material is excellent; namely, the wall material can be smoothly plastered and easily spread by trowels. As the wall material dries, after being plastered, the moisture originally absorbed by the short fibers is gradually transferred to plaster bases, so that the short fibers stay between the bases and the particles while bridging the aggregate particles to the plaster bases for stably holding the aggregate particles. The aggregate particles thus held appear as embossed surfaces of the wall and form an attractive wall surface.

Other objects and advantages of the present invention may be appreciated by referring to the following description taken in conjunction with the accompanying drawing, in which the single drawing is a partial enlarged schematic sectional view of a wall plastered with the wall material of the present invention.

In this figure, short fibers 3 stay between plaster bases 1 and aggregate particles 2, so as to firmly hold the particles to the bases.

The aggregate particles to be used in the wall material of the present invention consist of particles with a mean diameter of 0.2 to 3 mm., which are, for instance, natural materials, such as sand, Kansuiseki (stone produced in Japan, a kind of marble), perlite, and vermiculite, or artificial material, such as man-made sand, crushed stone, synthetic resin, natural rubber, and synthetic rubber. The grain size of the aggregate particles should preferably be 20 to 48 mesh for plastering by trowels, or 48 to 60 mesh for spraying.

The colored clay can be any of various clays available at different geographical locations, a mixture thereof, or clay which is dyed by any pigment or dyestuff.

The water-soluble paste to be used in the wall material of the invention can be cellulose sodium glycollate, methyl-cellulose, carboxy methylhydroxyethyl cellulose, hydroxyethyl cellulose, propyl cellulose, sodium alginate, starch, dextrin, polyvinyl alcohol, and the like.

Table 1 shows the workability and the conditions of plastered wall surface for wall materials having different ratios of sand and colored clay, which wall materials consist of 20 weight parts of cellulose sodium glycollate, 50 weight parts of powdered pulp with a mean length of 200 microns acting as short fibers, and 1,000 weight parts of sand (18 to 42 mesh) and colored clay (passing through 60 mesh).

TABLE 1

| Parts by volume | | | |
|---|---|---|---|
| Sand | Colored clay | Workability | Conditions of finished wall surface |
| 100 | 0 | Fairly difficult | Rough and porous bridged structure |
| 95 | 5 | Good | Fairly rough and porous bridged structure. |
| 90 | 10 | do | Do. |
| 80 | 20 | do | Finely porous bridged structure. |
| 70 | 30 | do | Do. |
| 60 | 40 | do | Very finely porous bridged structure. |
| 50 | 50 | do | Do. |
| 40 | 60 | do | Smooth surface. |
| 30 | 70 | do | Do. |

It is apparent from Table 1 that, in order to obtain an attractive embossed wall surface, the composition of the wall material should be restricted to consist of 95 to 50% by volume of aggregate and 5 to 50% by volume of colored clay. It was found that particularly a attractive wall surface can be achieved by mixing 80 to 60% by volume of aggregate particles with 20 to 40% by volume of colored clay. If the content of the colored clay surpasses 50% by volume, relative to that of the aggregate particles, it becomes difficult to produce an embossed surface on the wall, and the wall possibly cracks. Accordingly, such a large amount of clay is not preferable.

The short fibers to be used in the wall material of the invention are, for instance, natural fibers, regenerated fibers, synthetic fibers, and mineral fibers. The length of the fibers is preferably shorter than 2 mm. The preferred fiber material is powdered wood pulp, glass fibers, and asbestos fibers. If too long fibers are used, it will become difficult to form the desired embossed wall surface.

Table 2 shows the workability and the finished conditions of the wall for different wall materials containing a fibrous composition having a different ratio between cellulose sodium glycollate and powdered pulp with a mean fiber length of 200 microns, which wall material consists of 700 weight parts of sand (18 to 42 mesh), 300 weight parts of colored clay, and 20 weight parts of the fibrous composition.

TABLE 2

| Amount of powdered pulp (wt. percent on the main composition) | Workability | Degree of adhesion of main composition | Condition of finished wall surface |
|---|---|---|---|
| 0 | Not good | Poor | Finely porous bridged structure. |
| 1 | Good | Sufficient | Do. |
| 5 | do | do | Do. |
| 10 | do | do | Very finely porous bridged structure. |
| 15 | do | do | Do. |
| 20 | do | do | Smooth surface. |

It is apparent from Table 2 that, in order to achieve an attractive embossed wall surface, the content of the short fibers should be limited to 1 to 15% by weight, based on the sum of the aggregate particles and the colored clay.

If the content of the short fibers is too small, the adhesive strength of the aggregate particles to the wall surface becomes very poor. If the content of the short fibers is too high, the desired embossed surface can not be achieved, although a soft appearance similar to that of fibrous walls may be produced.

There are wall materials having short fibers, which are known, but the short fibers in such known wall material have a very small bulk specific gravity as compared with that of aggregate particles and the colored clay, and the fibers tend to become tangled when the wall materials are applied with a trowel or spray gun. As a result, the short fibers are apt to intertwine by themselves when the wall material is stored or handled. Furthermore, it requires a considerably large amount of labor to uniformly mix the short fibers in the wall material. If short fibers are assembled by themselves and left on the finished wall surface, they will degrade the attractiveness of the wall appearance. In addition, the short fibers sometimes deteriorates the workability of the wall material.

In order to mitigate such difficulties of known wall materials containing short fibers, the inventors have carried out a series of studies, and finally found an improved method for making it.

In a preferred embodiment of the present invention, firstly, short fibers are adhered to the surface of the aggregate particles, and then other wall materials, such as colored clay anad possibly water resistant substances, are added and mixed. Being thus attached to the surface of the aggregate particles, the short fibers are uniformly dispersed, to obviate their tendency to intertwine themselves. Besides, other ingredients of the wall material, such as the colored clay, are carried by the short fibers in the interstices therebetween so at to ensure uniform distribution thereof. As a result, the wall material of the invention can be plastered immediately after wetting it with water.

If the wall material is plastered by using a trowel, the short fibers on the aggregate particles reduce the friction between the trowel and such particles, for facilitating smooth spreading of the wall material. The short fibers attached to the aggregate particles remain thereon, i.e., on the surfaces of sand particles and crushed stone surfaces or the like, so that there will be no accumulation of short fibers formed on the finished wall surface.

Secondly, according to the present invention, the colored clay and short fibers can be integrally adhered to the individual particles of the aggregate material, together with other possible wall materials. In other words, the wall material is prepared in the granular form by mounting the colored clay and the short fibers on core particles consisting of individual aggregate particles. Thus, different ingredients of the wall material are uniformly dispersed. When water is added to the material for kneading, the water reaches to the inside of the individual granules thus formed, due to the capillary effects of the short fibers. The water thus reaching to the inside of the granules, will quickly dissolve the adhesive or paste material therein, for adhering the short fibers on the surface of the individual aggregate particles in the form of a thin film thereon. Accordingly, the short fibers are uniformly dispersed on the surface of aggregate granules, so as to reduce the friction between the aggregate and the trowel for plastering. Consequently, there will be produced no accumulation of the short fibers on the finished wall.

The preparation of such granular wall material of satisfactory grade, however, requires strict control of the entire process of the formation thereof. If, for instance, the individual granules are made too hard, the permeation of water becomes difficult and the dissolution of the adhesive or paste material takes a long time. Consequently, the different ingredients in the granules are not sufficiently dispersed in the wet wall material. Sometimes, such granules are adhered with each other to form certain blocks. which may remain locally on the finished wall surface to spoil its visual appearance. On the other hand, if the granules are made too soft, the individual granules may be crushed during transportation, so as to reduce the uniformity of the wall material. Accordingly, neither too hard granules nor too soft granules are desirable.

After repeated careful tests, the inventors have found that an excellent wall material can be achieved by applying ingredients, except the adhesive or paste substance, to the surface of the aggregate particles, such as sand and crushed stone, and then mixing the adhesive or paste substance with the granules having ingredients thus placed on the surface of the aggregate particles. With the material thus formed, the adhesive or paste substance, which tend to disturb the permeation of water into the individual granules, are not firmly applied to the granules, and hence, upon addition of water therein, individual granules quickly dissolve in water. The desired uniform dispersion of different ingredients can be achieved by simple agitation or kneading, so that the liquid paste or adhesive is uniformly dispersed in the wall material having a high water holding power. Then the wall material can easily be plastered on a wall, either by trowelling or by spraying, so that the desired attractive wall surface can be achieved.

According to another embodiment of the present invention, there is provided a wall material consisting of main ingredients including aggregate particles and colored clay, an adhesive ingredient including a watersoluble paste substance, and short fibers, which material is characterized by comprising (a) first granules each including the aggregate particles, colored clay, short fibers, and other ingredients except the adhesive ingredient, and
(b) second granules each including the aggregate particles and a water-soluble paste substance acting as the adhesive ingredient.

With the wall material comprising such first granules and second granules, which are thoroughly mixed together, upon addition of water, the first granules quickly dissolve therein because no paste substance is included therein, while the paste substance of the second granules also quickly dissolves in the water in a highly uniform fashion because the paste substance layers have a very wide surface area. Thus, the danger of the accumulation of paste substance in the wall material and on the finished wall surface is completely eliminated. After simple kneading, the wall material can easily be applied to a wall, either by trowelling or by spraying, to produce the desired attractive wall surface.

As regards the water-soluble paste substance, cellulose sodium glycollate has a high dissolving speed and a high initial adhesiveness, and indicates excellent workability because of its high water holding power, but its weather resistivity is slightly inferior. Methyl cellulose with a comparatively low dissolving speed has excellent weather resistivity and alkali resistivity, but its workability is not so good. Polyvinyl alcohol has a poor dissolving speed, but excellent adhesiveness, without deteriorating the viscosity. In short, it is preferable to use a paste substance consisting of a mixture of cellulose sodium glycollate and methyl cellulose, or a mixture of cellulose sodium glycollate and polyvinyl alcohol. Such mixtures show the excellent properties of the individual ingredients, and results in excellent wall appearance.

If two kinds of paste substances having different dissolving speeds are used, the one having a high dissolving speed, such as cellulose sodium glycollate, tends to swell before the first granules dissolve. Such swollen paste may tend to adhere to similarly swollen paste of adjacent second granules to form accumulated large particles. On the other hand, the paste substance having a slow dissolving property begins to dissolve in water after the first granules have completely dissolved in water for uniform dispersion therein.

In order to obviate such difficulty, according to another embodiment of the present invention, there is provided a wall material using two kinds of paste substances, consisting of (a) quickly dissolving granules having quickly dissolving paste substance applied to individual aggregate particles, and
(b) slowly dissolving granules each individually having one of colored clay, short fibers, slowly dissolving paste substance, and aggregate particles, which other granules are thoroughly mixed with the quickly dissolving granules.

With the wall material having both the quickly dissolving and slowly dissolving granules, upon addition of water therein, the quickly dissolving paste substance is fast in dissolving in water due to its large contacting surface area with water, so as to provide the initial adhesive power to the wall material. In the other granules, the slowly dissolving paste material is dissolved in water after other wall materials are completely dissolved in water. By simple kneading, all the wall materials are thoroughly mixed and uniformly dispersed in the water. It should be noted here that the slowly dissolving paste substance is mixed to an overwhelmingly large quantity of the rest of the ingredients of the wall material, i.e., the aggregate particles, the colored clay, the short fibers, and others, so that upon the kneading after the addition of the water, the slowly dissolving paste substance is also uniformly dispersed. Consequently, the dissolving time of the slowly dissolving paste substance itself is somewhat shortened.

What is meant by the "other wall material ingredients" in the present invention are pigments, dyestuffs, water resistant agents, antiseptics, dispersing agents like bentonite, and the like.

Thre wall material of the present invention can be easily sprayed, although spraying has been considered to be difficult heretofore in the case of wall materials as referred to.

The fact that the spraying is possible seems to be due to the fact that the wall material is prepared in the form of granules by applying the colored clay and the short fibers on the aggregate particles, e.g., sand particles and crushed stone particles, together with the rest of the ingredients. With such granular form, the aggregate particles are well dispersed upon the kneading with water. When the wall material is sprayed, the short fibers stick to the surface of individual aggregate particles, to provide for plastic deformation thereof, so as to eliminate the repulsion between adjacent aggregate particles.

The invention will now be described in further detail, referring to examples.

EXAMPLE 1

A mixture consisting of 700 weight parts of sand (18 to 42 mesh), 300 weight parts of colored clay (60 mesh), 50 weight parts of powdered pulp (with a mean fiber length of 200 microns), and 20 weight parts of cellulose sodium glycollate was thoroughly mixed for twenty minutes by a mixer, to prepare a wall material composition. After adding 800 weight parts of water into the mixture thus prepared, it was kneaded. The wall material thus formed was plastered by a trowel on a plaster board.

Excellent embossed wall surface was provided.

EXAMPLE 2

After uniformly mixing 1,000 weight parts of sand with 100 weight parts of a 2% aqueous solution of cellulose sodium glycollate, 30 weight parts of powdered pulp with a mean fiber length of 200 microns was added and thoroughly mixed. The mixture was then dried at 100° C. for two hours, to provide sand particles having powdered pulp fibers attached to the surface thereof. Then, 20 weight parts of cellulose sodium glycollate, 300 weight parts of colored clay, and 1 weight part of water resistant agent consisting of chromium acetate were added to the sand particles with short fibers attached thereto and mixed thoroughly.

The mixture thus prepared proved to be an excellent wall material.

EXAMPLE 3

A dilute solution of vinyl acetate emulsion was applied to 1,000 weight parts of Kansuiseki, and 30 weight parts of glass fibers with a mean diameter of 0.02 mm. and a mean length of 1 mm. were added and mixed uniformly. By drying at 120° C. for one hour, Kansuiseki particles having short glass fibers coated thereon were obtained. An excellent wall material was prepared by adding 15 weight parts of cellulose sodium glycollate and 1 weight part of chromium acetate to the Kansuiseki particles coated with the glass fibers, and thoroughly mixing.

EXAMPLE 4

The surface of 1,000 parts by weight of sand particles was wetted by adding 150 weight parts of water therein, and 30 weight parts of powdered pulp with a mean fiber length of 200 microns and 20 weight parts of cellulose sodium glycollate were added to the wet sand and thorouhgly mixed. Then, 200 weight parts of colored clay was added and again mixed thoroughly.

The mixture thus prepared proved to be an excellent wall material.

EXAMPLE 5

After uniformly mixing 40 weight parts (about 1,000 volume parts) of perlite of a mean grain size of 16 mesh with 150 weight parts of a 2% aqueous solution having cellulose sodium glycollate, 30 weight parts of powdered pulp with a mean fiber length of 200 microns and 30 weight parts of powder particles of cellulose sodium glycollate were added therein together with 200 weight parts (about 160 volume parts) of colored clay, and then mixed thoroughly.

The mixture thus prepared also proved to be an excellent wall material.

EXAMPLE 6

The surface of 1,000 weight parts of wooden particles with a mean grain size of 16 mesh was uniformly wetted by adding 600 weight parts of water. Then, 50 weight parts of cellulose sodium glycollate and 200 weight parts of powdered pulp with a mean fiber length of 200 microns were added and mixed thoroughly, and dried at 100° C. for two hours for producing wooden particles with pulp short fibers attached thereto. An excellent wall material was prepared by adding 600 weight parts of colored clay to the wooden particles with pulp short fibers thus attached thereto and mixing them thoroughly.

EXAMPLE 7

The surface of 1,000 weight parts of sand particles with a mean grain size of 32 mesh was wetted by adding 100 weight parts of 1% aqueous solution of cellulose sodium glycollate acting as an adhesive, and then 300 weight parts of colored clay and 30 weight parts of powdered pulp were added and mixed and dried. An excellent wall material was prepared by adding 20 weight parts of adhesive consisting of cellulose sodium glycollate in the mixture thus dried.

EXAMPLE 8

After wetting 5,900 weight parts of sand (with a mean grain size of 32 mesh) by adding 650 weight parts of water, 2,200 weight parts of colored clay and 300 weight parts of powdered pulp were added and mixed thoroughly. After the mixture attained a granular state, it was dried at about 110° C. for three hours, to provide first granules consisting of the sand, the colored clay, and the powdered pulp.

Separately, the surface of 1,450 weight parts of sand particles was wetted by adding 150 weight parts of water, and furthermore, 150 weight parts of cellulose sodium glycollate was added. The mixture was continuously agitated, until granules with the sand particle cores were formed. Second granules were produced by drying the latter mixture at about 80° C. for three hours, which second granules consisted of the sand particles and the cellulose sodium glycollate.

The mixture of the first and second granules proved to be an excellent wall material.

EXAMPLE 9

The surface of 700 weight parts of urea resin particles (with a mean grain size of 24 mesh) was wetted by adding a dilute solution of polyvinyl alcohol, and then 540 weight parts of colored clay and 80 weight parts of powdered pulp were added together with 60 weight parts of bentonite. The mixture was continuously mixed until it attained a granular form, and dried at about 80° C. for five hours, to provide first granules consisting of the synthetic resin, the colored clay, the powdered pulp, and the bentonite.

Separately, 300 weight parts of similar urea resin beads were wetted by adding 50 weight parts of water, and then 50 weight parts of cellulose sodium glycollate were added and mixed, until it became granular. Second granules were prepared by drying the latter mixture at about 80° C. for three hours.

The mixture of the first and the second granules proved to be an excellent wall material.

EXAMPLE 10

After wetting 1,450 weight parts of sand (with a mean grain size of 32 mesh) by adding 150 weight parts of water, 150 weight parts of cellulose sodium glycollate was added and continuously mixed, until it became granular in form with sand particles as cores thereof. The mixture was dried at about 80° C., to provide first granules consisting of the sand and the cellulose sodium glycollate.

Separately, 5,860 weight parts of sand was wetted by 650 weight parts of water, and 2,200 weight parts of colored clay and 300 weight parts of powdered pulp were added thereto together with 40 weight parts of methyl cellulose, and the mixture was continuously mixed, until it became granular with the sand particles as cores. The latter mixture was then dried at about 100° C. for three hours, to provide second granules consisting of the sand, the colored clay, the powdered pulp, and the methyl cellulose.

The mixture of the first and the second granules proved to be an excellent wall material.

The wall materials of Examples 2 to 10 maintain their granular shape even when they are exposed to violent vibration.

Upon addition of water thereto, the granules quickly dissolve in the water, and the ingredients are uniformly dispersed by simple kneading, so that the wall material becomes ready for plastering either by a trowel or by spraying. The wall material can easily be plastered by a trowel, even by an unskilled man, without causing any uneven blocks or particles on the wall surface. Thus, attractive Japanese style walls can easily be prepared.

Although the present invention has been described with a certain degree of particularity, it is understood that the present disclosure has been made only by way of example and that numerous changes in the details of composition and manufacturing procedures may be resorted to without departing from the spirit and the scope of the invention as hereinafter claimed.

What we claim is:

1. A method of making a material for forming a wall surface having an embossed appearance, which material comprises 50 to 95% by volume of mineral aggregate particles having a mean diameter of 0.2 to 3 mm. 50 to 5% by volume of colored clay, 1 to 15% by weight, based on the total weight of said aggregate particles and said colored clay, of short fibers shorter than 2 mm., and a water soluble adhesive, said method comprising the steps of applying said water soluble adhesive on the surface of said aggregate particles selected from the group consisting of sand and particles of crushed stones, adhering said short fibers to the surface of said aggregate particle with the applied water soluble adhesive, drying the resulting aggregate particles coated with the short fibers, and mixing said colored clay with said dried fiber-coated aggregate particles with a sufficient amount of water to form a material which may be sprayed or trowelled on a wall.

2. A method of making a material for forming a wall surface having an embossed apperance, which material comprises 50 to 95% by volume of mineral aggregate particles having a mean diameter of 0.2 to 3 mm., 50 to 5% by volume of colored clay, 1 to 15% by weight, based on the total weight of said aggregate particles and said colored clay, of short fibers shorter than 2 mm., and a water soluble adhesive, said method comprising the steps of applying a first portion of said water soluble adhesive to the surface of said aggregate particles selected from the group consisting of sand and particles of crushed stones, adhering said short fibers on each of said aggregate particles with the applied water soluble adhesive, mixing the resulting fiber-coated aggregate particles with said colored clay to form granules, and mixing the resulting granules with a second portion of said water soluble adhesive and a sufficient amount of water to form a material which may be sprayed or trowelled on a wall.

3. A method according to claim 2, comprising the steps of adhering said short fibers on one sort of said aggregate particles and coating the resulting particles with said colored clay to form first granules and adhering said short fibers on a second sort of said aggregate particles and coating the resulting particles with said colored clay, to form second granules and mixing the first and second granules.

4. The method according to claim 2, comprising the steps of adhering said short fibers on a first group of said aggregate particles with one of said water soluble adhesives and coating the resulting particles with said colored clay to form first granules and adhering said short fibers on a second group of said aggregate particles with another water soluble adhesive and coating the resulting particles with said colored clay to form second granules and mixing the first and second granules.

References Cited

UNITED STATES PATENTS

| | | | |
|---|---|---|---|
| 3,617,329 | 11/1971 | Goff | 117—27 |
| 3,629,116 | 12/1971 | Gartner et al. | 117—126 GQ |
| 3,630,820 | 12/1971 | Leach | 161—162 X |
| 3,408,316 | 10/1968 | Mueller et al. | 252—62 |
| 3,523,085 | 8/1970 | Shannon | 252—62 |
| 3,560,323 | 2/1971 | Zwickert | 252—62 |
| 3,522,067 | 7/1970 | MacArthur | 252—62 X |
| 3,154,427 | 10/1964 | Forrest et al. | 117—41 |
| 3,169,075 | 2/1965 | Morrow et al. | 117—100 S |
| 3,233,697 | 2/1966 | Slayter et al. | 252—62 X |
| 3,284,227 | 11/1966 | Gerton | 161—270 X |
| 3,450,547 | 6/1969 | Sams et al. | 252—62 X |
| 3,467,535 | 9/1969 | Myles | 252—62 X |
| 3,514,403 | 5/1970 | Muendel | 252—62 |

HAROLD ANSHER, Primary Examiner

U.S. Cl. X.R.

117—41, 100 S, 126 AQ, 126 GQ; 161—162, 165, 168, 169